US010766288B2

(12) United States Patent
Vandroux et al.

(10) Patent No.: US 10,766,288 B2
(45) Date of Patent: Sep. 8, 2020

(54) IMPROVING A DEPTH IMAGE SUBJECT TO A SHADOW EFFECT (71) Applicant: IDEMIA FRANCE, Courbevoie (FR)

(72) Inventors: Coralie Vandroux, Colombes (FR); Benoît Berthe, Colombes (FR)

(73) Assignee: IDEMIA FRANCE, Courbevoie (FR)

( * ) Notice: Subject to any disclaimer, the term of this patent is extended or adjusted under 35 U.S.C. 154(b) by 0 days.

(21) Appl. No.: 16/319,442

(22) PCT Filed: Jul. 21, 2017

(86) PCT No.: PCT/FR2017/052004
§ 371 (c)(1),
(2) Date: Jan. 21, 2019

(87) PCT Pub. No.: WO2018/015685
PCT Pub. Date: Jan. 25, 2018

(65) Prior Publication Data
US 2019/0250547 A1  Aug. 15, 2019

(30) Foreign Application Priority Data
Jul. 22, 2016 (FR) .................................. 16 57064

(51) Int. Cl.
*B41M 5/24* (2006.01)
*G06T 5/00* (2006.01)
(Continued)

(52) U.S. Cl.
CPC ................ *B41M 5/24* (2013.01); *B41M 3/14* (2013.01); *B42D 25/00* (2014.10); *B42D 25/41* (2014.10); *G06T 5/008* (2013.01)

(58) Field of Classification Search
CPC ........... B41M 5/24; B41M 3/14; G06T 5/008; B42D 25/00; B42D 25/41
See application file for complete search history.

(56) References Cited

U.S. PATENT DOCUMENTS

2009/0201386 A1\* 8/2009 Ono ...................... H04N 5/3572
348/222.1
2011/0285879 A1\* 11/2011 Hatakeyama ........... G06T 5/003
348/241

OTHER PUBLICATIONS

International Search Report dated Nov. 8, 2017 in corresponding PCT Application No. PCT/FR2017/052004, 2 pages.
(Continued)

*Primary Examiner* — Justin Seo
(74) *Attorney, Agent, or Firm* — MH2 Technology Law Group, LLP

(57) ABSTRACT

A method and device for producing a target image having pixels (2) juxtaposed in a substrate (1) presenting thickness and producing an image presenting thickness such that each pixel (2) produces a shadowing effect on its neighboring pixels. The method includes: determining a production setpoint from the target image; and producing an image made by the device using the production setpoint. The determining operation replaces the production setpoint with an improved production setpoint that is determined by modeling the image production device using a transfer function for transforming a production setpoint into a predicted image; and determining an improved production setpoint in which the image produced by the transfer function is as close as possible to the target image, so as to reduce the consequences of the shadowing effect in the resulting image. Also included is the image produced by such a method.

24 Claims, 3 Drawing Sheets

Setpoint shape for the laser spot

Shape of laser spot as actually made

Input impulse

Profile of the laser diffusing in the material of the substrate (51) Int. Cl.
*B41M 3/14* (2006.01)
*B42D 25/00* (2014.01)
*B42D 25/41* (2014.01)

(56) References Cited

OTHER PUBLICATIONS

Chen, X. et al., "3D printing robot: model optimization and image compensation", J Control Theory Appl, 2012, vol. 10, No. 3, pp. 273-279.

Hebert, M. et al., "Extending the Clapper-Yule model to rough printing supports", J. Opt. Soc. Am. A, 2005, vol. 22, No. 9, pp. 1952-1967.

Bonnefois, A. M. et al., "Etude theorique et experimentale d'un laser a solide de forte puissance moyenne, declenche a haute-cadence et possedant une bonne qualite de faisceau", URL: "http://www.iaea.org/inis/collection/NCLCollectionStore/_Public/41/021/41021830.pdf", 2006, pp. 1-177, (including English Abstract, pp. 1-2).

\* cited by examiner

IMPROVING A DEPTH IMAGE SUBJECT TO A SHADOW EFFECT

CROSS-REFERENCE TO RELATED APPLICATIONS

This application is a U.S. National Stage application of International Application No. PCT/FR2017/052004 filed 21 Jul. 2017, which claims priority to French Application No. 1657064 filed 22 Jul. 2016, the entire disclosures of which are hereby incorporated by reference in their entireties.

BACKGROUND OF THE INVENTION

The present invention relates to the method of producing an image, and more particularly to an improvement in such a method in the situation in which the method of producing the image produces an image that presents thickness such that a shadowing effect is produced.

Certain methods of producing images produce an image that presents thickness. Whatever the way in which the image is produced, when such an image is observed, it is usually observed under multidirectional illumination. For an image that is defined in thickness, this has the harmful effect of each pixel projecting a shadow as a function of the opacity of that pixel onto neighboring pixels. The extent of the neighborhood that is affected in this way depends on the thickness of the pixels.

Such a shadowing effect modifies the image actually made in comparison with a desired target image, in that the image actually made is darker and fuzzier than the target image.

It may be observed that this phenomenon of harmful shadowing does not exist for an image printed in conventional manner. Specifically, the depth or thickness of printing ink is sufficiently negligible compared with the transverse dimensions of a pixel to ensure that no shadowing can occur, or at least that no shadowing is perceptible.

Furthermore, when printing by laser, diffusion of the laser in the substrate-forming material can also lead to harmful effects as described below, which effects should desirably be corrected when printing an image by laser.

OBJECT AND SUMMARY OF THE INVENTION

The invention remedies that drawback. The principle of the invention consists in improving the production setpoint as supplied to the image production method in such a manner that the image produced on the basis of the improved production setpoint is as close as possible to the target image that is desired, with the consequences of the shadowing effect being reduced as much as possible, or indeed in such a manner as to correct the effects dynamics, i.e. distortion associated with the diffusion of the laser in the material constituting the substrate that receives the printing.

Figure 6:
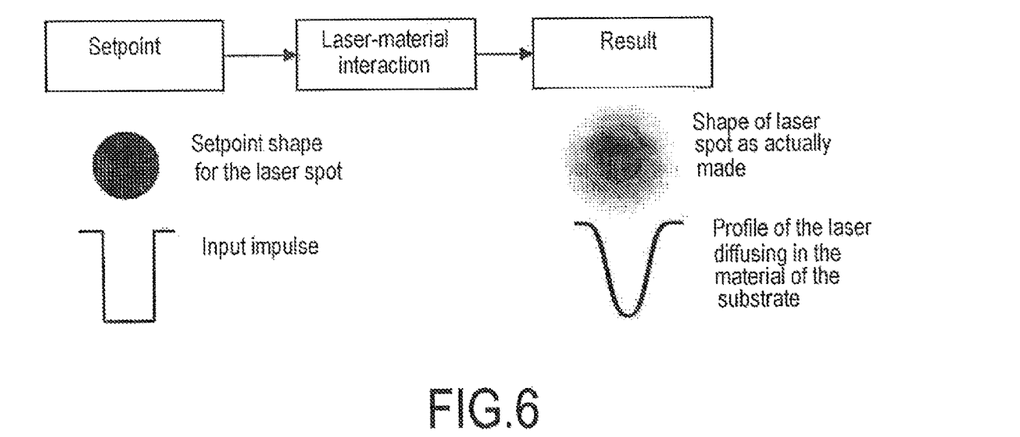
FIG. 6 is a diagram showing the interaction between the laser and the material of the substrate while printing an image by laser.

As shown in FIG. 6, when the laser reacts with the material it is subjected to a diffusion effect and it responds with its own dynamic behavior. Specifically, as in any system, it cannot respond perfectly to a pulse, and as a result a response is observed that is less sharp and more diffuse. Furthermore, the particles of the substrate that become burnt also diffuse. These effects of the laser diffusing in the material of the substrate run the risk of modifying or degrading the image as actually made compared with a target image that it is desired to obtain printing by laser. These phenomena, generally referred to as "diffusion effects" resulting from interaction between the laser and the material in the material of the substrate are well known to the person skilled in the art and are therefore not described in greater detail in this document. It is thus desirable to correct these effects of the laser diffusing in the material as a result of interaction between the laser and the material by adapting the production setpoint accordingly in the manner explained below.

For this purpose, the invention models the image production device and its shadowing effect by means of a transfer function that supplies a predicted image when the image production device is applied to a production setpoint. This function is subsequently "inverted" to determine an optimum improved production setpoint such that the image production device having the improved production setpoint applied thereto produces an image that is made as close as possible to the target image.

The invention provides a processing method for producing an image, referred to as a "final" image, comprising pixels juxtaposed in a substrate presenting thickness and producing an image that possesses thickness so that each pixel produces a shadowing effect on its neighboring pixels, said method comprising a determination step of using a target image to determine a production setpoint S suitable for being used by an image production device to produce said final image;

wherein the determination step comprises the following steps:
- modeling the image production device by means of a transfer function F that transforms a production setpoint S into a corresponding predicted image; and
- by inverting at least a portion of the transfer function F, determining an improved production setpoint SA suitable for being used as a production setpoint S by the production device in order to produce said final image in such a manner as to correct, at least in part, the shadowing effect in the final image, and optionally also to correct at least in part the laser diffusion effect that results from laser-material interaction in a substrate.

By way of example, the processing method of the invention may be performed by a processor device.

In a particular implementation, during the determination step, the improved production setpoint SA is selected so that the corresponding predicted image is as close as possible to the target image in order to minimize the shadowing effect in the final image.

In a particular implementation, the thickness of the substrate of the image is not less than n times the transverse dimension of a pixel, where n=2, or indeed n=1.5.

In a particular implementation, the image production device is a laser etching device suitable for darkening a transparent substrate in its thickness and a production setpoint is a map of laser shots.

In a particular implementation, the image production device is a microperforation device suitable for making microholes in the thickness of a transparent substrate and a production setpoint is a map of perforations.

In a particular implementation, the modeling of the image production device determines a transmittance for the production setpoint as an intermediate result.

In a particular implementation, the transfer function combines a transmittance first function transforming a production setpoint into a transmittance, a reflectance second function transforming a transmittance into a reflectance, and an image third function transforming a reflectance into a predicted image.

In a particular implementation, the first function is defined in a parametric form, and the parameters are determined by calibration.

In a particular implementation, the first function is determined empirically and is tabulated.

In a particular implementation, the second function is given by the following formula:

$$R = F2(T) = \frac{b \cdot k_1 \cdot T^2}{1 - k_2 \cdot T^2} + \frac{(1-b) \cdot k_1 \cdot (T * M) \cdot T}{1 - k_2 \cdot (T^2 * M)}$$

where R is a reflectance matrix, $b \in [0,1]$ is a scalar parameter, $k_1, k_2 \in [0,1]$ are two optical constants, T is the transmittance matrix, * is the convolution operator, and M is a convolution kernel.

In a particular implementation, the second function also includes noise K having the formula:

$$R = F2(T) = \left( \frac{b \cdot k_1 \cdot T^2}{1 - k_2 \cdot T^2} + \frac{(1-b) \cdot k_1 \cdot (T * M) \cdot T}{1 - k_2 \cdot (T^2 * M)} \right) * K$$

where * is the convolution operator and K is a convolution kernel.

In a particular implementation, K is a two-dimensional Gaussian kernel of standard deviation $\sigma$.

In a particular implementation, $k_1 = (1 - r_s) \cdot r_g \cdot (1 - r_i)$ and $k_2 = r_g \cdot r_i$, where $r_s$ is the specular reflection index of the air-image interface, $r_i$ is the internal Fresnel reflectance index of the air-image interface, and $r_g$ is the intrinsic reflectance index of a Lambertian reflector substrate.

In a particular implementation, the convolution kernel M is a normalized unity square matrix of dimensions d×d, i.e. $M = [1/d^2]_{d \times d}$.

In a particular implementation, the third function is the identity function.

In a particular implementation, the transfer function is calibrated by identifying the parameters b, d and optionally the standard deviation $\sigma$, by solving the following equation:

$$b, d, \sigma = \underset{\substack{b \in [0,1] \\ d > 0 \\ \sigma \geq 0}}{\operatorname{argmin}} \sum_p \Delta(IR_p, IP_p) = \underset{\substack{b \in [0,1] \\ d > 0 \\ \sigma \geq 0}}{\operatorname{argmin}} \sum_p \Delta(IR_p, F(S_p))$$

where S is a production setpoint, IR is an image obtained by means of the production device using the production setpoint S, IP is a predicted image as predicted by the transfer function F from the production setpoint S, i.e. IP=F(S), p is an index running through the pixels, F is the transfer function, and $\Delta$ is a colorimetric distance between two pixels.

In a particular implementation, the solving operation is fed with calibration pairs comprising a production setpoint and an image by means of the production device using the production setpoint.

In a particular implementation, the step of determining an improved production setpoint SA comprises an automatic interactive calculation minimizing a distance between the target image IO and a predicted image IP as predicted by the transfer function F when applied to the improved production setpoint SA.

In a particular implementation, the step of determining an improved production setpoint SA comprises solving the following equation:

$$SA = \underset{\hat{S}}{\operatorname{argmin}} \sum_p (\Delta(IO_p, IP_p))^2 = \underset{\hat{S}}{\operatorname{argmin}} \sum_p (\Delta(IO_p, F(S_p)))^2$$

where S is a production setpoint, IO is a target image, IP is an image as predicted by the transfer function from the production setpoint S, i.e. IP=F(S), p is an index running through the pixels, F is the transfer function, and $\Delta$ is a colorimetric distance between two pixels.

In a particular implementation, during the determination step, the improved production setpoint SA is determined so that it also corrects at least in part the laser diffusion effect that can result from laser-material interaction in the material of a substrate.

The invention also provides a production setpoint produced by such a method.

The invention also provides a method of producing an image, referred to as a "final" image, the method comprising the following steps:

using a processor device to determine an improved production setpoint SA by a method as defined above; and using an image production device to produce said final image by using said improved production setpoint SA as its image production setpoint.

The invention also provides a processor device configured to produce an image, referred to as a "final" image, which image comprises pixels juxtaposed in a substrate presenting thickness and producing an image that possesses thickness so that each pixel produces a shadowing effect on its neighboring pixels, said processor device comprising: an acquisition unit for acquiring a target image; and a determination unit configured to use the target image to determine a production setpoint S, wherein the determination unit is configured to:

model the image production device by means of a transfer function F transforming a production setpoint S into a corresponding predicted image; and by inverting at least a portion of the transfer function F, determining an improved production setpoint SA suitable for use as a production setpoint S by the production device in order to produce said final image in such a manner as to correct at least in part the shadowing effect in the final image, and optionally also in such a manner as to correct at least in part the diffusion effect that results from laser-material interaction.

BRIEF DESCRIPTION OF THE DRAWINGS

Other characteristics, details, and advantages of the invention appear more clearly from the detailed description given below by way of indication and with reference to the drawings, in which.

DETAILED DESCRIPTION OF IMPLEMENTATIONS

Figure 1:
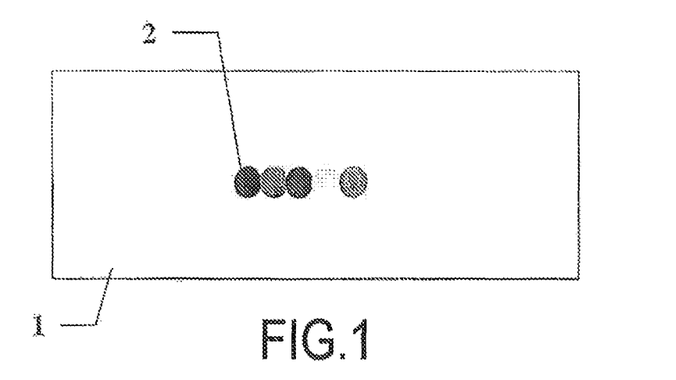
FIG. 1 is a plan view of a medium having an image made by laser etching.
Figure 2:
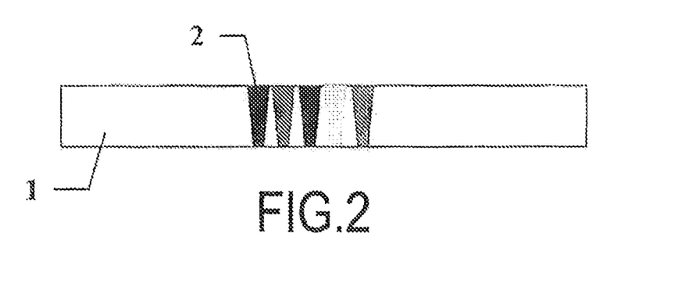
FIG. 2 is a profile view of the FIG. 1 medium.

FIGS. 1 and 2 show an embodiment of an image production device. As shown in FIG. 1, the device creates an image made up of a juxtaposition of image or picture elements 2 known as "pixels", in a medium or substrate 1. The particular feature of image production methods considered herein lies in the pixels 2 presenting considerable thickness, as can be seen more particularly in the profile view of FIG. 2. The pixels 2 may be of various hues, opacities, and/or heights.

Figure 3:
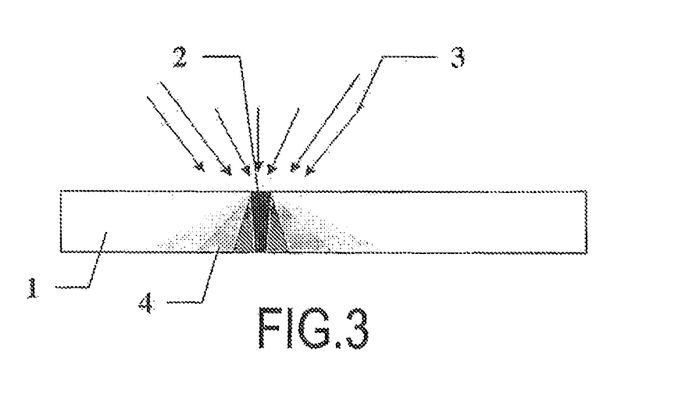
FIG. 3 shows the action of multidirectional illumination on an element of a laser-etched image and shows the problem of shadowing.

As a result, and as shown in FIG. 3, when the medium 1 is subjected to illumination 3, typically multidirectional illumination as generally occurs when the image is observed, each pixel 2 projects a shadow 4 on its neighbors. This has the harmful effect of increasing fuzziness and of darkening the image that is produced.

It is considered that such a shadowing effect occurs, at least sufficiently for it to be detected, when the thickness of the image, i.e. more precisely the thickness of the substrate supporting the image 1, is at least two times or even 1.5 times the transverse dimension of a pixel 2. The thickness of the substrate 1 determines the maximum height or thickness of a pixel 2. The transverse dimension of a pixel 2 is one of its dimensions in the image plane, i.e. depending on circumstances: its width; its length; or its diameter. The ratio of thickness over transverse dimension is not less than two. There is no upper limit. For implementations using laser etching, laser dots having a typical diameter of 40 micrometers ($\mu m$) can be made in a laser-sensitive layer having thickness that may be as great as 400 $\mu m$, i.e. giving a ratio of 10. In the implementations that are conventionally used, this ratio is about 5, with the thickness of the substrate 1 lying in the range 150 $\mu m$ to 250 $\mu m$.

In the present document, the "thickness of the substrate" (or the thickness of the image) corresponds to the total thickness of the substrate containing the pixels and in which light rays (coming from illumination) can travel. This thickness of the substrate may comprise a top portion of the substrate situated over the pixels and/or a bottom portion of the substrate situated under the pixels.

In the present document, the invention applies more particularly to images for which the thickness of the substrate supporting the image is at least twice, or even at least 1.5 times the transverse dimension of a pixel 2.

Image production devices that create an image possessing thickness so that a shadowing effect occurs include laser etching devices.

The principle of producing an image by laser etching makes use of a medium 1 having at least a portion that is sensitive to the laser in that it becomes darker at the point where the laser shot occurs and encounters said portion. The thickness of such a pixel 2, and thus its level of opacity, are a function of the intensity and/or of the duration of the laser shot. A laser makes it possible to shoot accurately on a given point and with an intensity that is finely modulated. A series of laser shots thus makes it possible, pixel 2 by pixel 2, to create an image made up of juxtaposed pixels 2 that are of various selected opacities Making direct use of this principle enables a monochrome image to be produced. The gray scale resolution is large in association with the intensity resolution of the laser.

It is also known to make a polychromatic image by applying the above principle to a medium 1 that includes, in superposition with the laser-sensitive layer, a matrix of color dots. A laser-blackened pixel serves to mask a color dot in proportional manner. With a matrix having colors selected from a base of primary colors, laser dots masking color dots selectively and in proportional manner make it possible to express a hue by combining the non-masked base colors.

These production devices that create an image possessing thickness so that a shadowing effect occurs also include microperforation devices.

The principle of producing an image by microperforation makes use of a medium in which microholes are made. By varying the size, the number, and/or the depth of the microholes, it is possible to create pixels of various determined opacities. A series of microholes thus makes it possible, pixel 2 by pixel 2, to create an image made up of juxtaposed pixels 2 of various selected opacities. Direct use of this principle makes it possible to produce a monochrome image.

In common, all of these devices share producing an image that possesses thickness. This thickness gives rise to a harmful shadowing effect that causes the resulting image, referred to as the "final" image, to be made fuzzier and darker than the target image that it is desired to produce.

The invention is applicable to all such devices.

In order to reduce the consequences of the shadowing effect, and possibly in order to reduce also the effect of diffusion that results from laser-material interaction, the invention proposes reusing the image production device in an image production method after improving the production setpoint. The image production device produces an image I, or resulting image IR (or final image IR) on the basis of a production setpoint S. The image production method may be any such method.

In the context of a microperforation device, the production setpoint S is a perforation map defining where a pixel is to be made and the number of holes, the hole sizes, and the hole depths that make up the pixel.

In the context of a laser etching device, the production setpoint S is a map of shots. A map of shots S is a two-dimensional matrix having as many elements as there are pixels 2, each element being spatially associated with a pixel 2 and comprising a laser shot intensity. This intensity is typically specified by a value lying in the range 0 to 255. By way of example, 0 means no laser shot and thus a "white" dot, and 255 specifies a maximum intensity and thus a "black" dot. Alternatively, the map of shots S may be normalized, with each of its elements lying in the range 0 to 1.

In the prior art, a production setpoint S is determined by analyzing the target image IO that it is desired to produce. The production setpoint S is supplied to the image production device that performs the production (series of laser shots or of microholes) in compliance with the production setpoint S in order to produce a resulting image IR (or final image IR) that is then disturbed by the shadowing effect, and is thus different from the target image IO.

In this document, the target image IO is a predetermined image that it is desired to produce. The resulting image IR is the image that is actually produced by the image production device on the basis of a production setpoint.

In the invention, the method makes use of the image production device, but beforehand it replaces the prior art production setpoint S (i.e. improves it) by means of an improved production setpoint SA. This improved production setpoint SA is supplied to the image production device, which performs image production in identical manner, but using the improved production setpoint SA in order to produce a new resulting image IR that is improved. This image is improved in that it is less subject to the consequences of the shadowing effect.

In this document, the term "improved production setpoint" is used to mean a production setpoint that is to be taken into account as input by an image production device in order to produce an image by printing by laser, the production setpoint being improved compared with a conventional production setpoint, in particular for the purpose of correcting the shadowing effect, as explained above.

Figure 5:
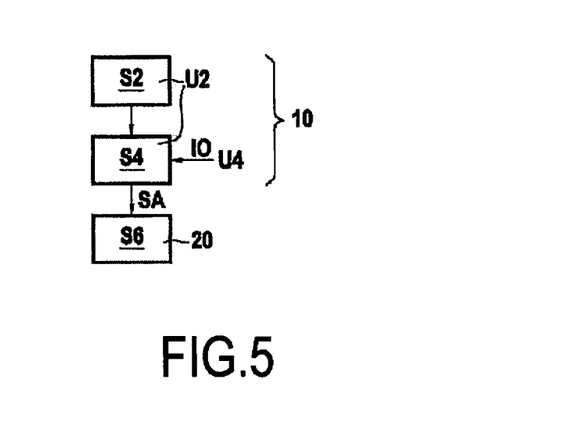
FIG. 5 is a block diagram showing the steps performed by a processor device and by an image production device in a particular implementation of the invention.

The production setpoint is improved by taking account of the shadowing effect in such a manner as to invert its effects, insofar as possible, in the form of corrections incorporated in the new production setpoint SA. Where possible, the effect of diffusion resulting from laser-material interaction in the material of the substrate can also be inverted. For this purpose, in a particular implementation, the method of the invention performs two steps S2 and S4 serving to calculate an improved production setpoint SA, as shown in FIG. 5. The steps S2 and S4 as described below are performed by a processor device 10 configured to make it possible subsequently to produce a resulting image IR, with the processor device 10 possibly being in the form of a computer or calculation means.

The processor device 10 may comprise a processor with non-volatile memory, which memory may store a computer program that is executable by the processor in order to perform the steps S2 and S4 as described below.

A first step S2 consists in modeling the image production device 20 in the form of a transfer function F that transforms a production setpoint S into a predicted image IP. Each image coming from the transfer function is referred to as a predicted image IP. This transfer function F thus makes it possible, for a plurality of production setpoints S, to determine respective corresponding predicted images IP;

During a second step S4, the method inverts all or part of the transfer function F in order to determine a production setpoint SA so that the predicted image IP as transformed from the production setpoint SA by the transfer function F, i.e. IP=F(SA), is as close as possible to the target image IO, i.e. F(SA)=IP≈IO. In other words, during this second step S4, by inverting the transfer function F (or at least a portion of the function F), the processor device 10 determines a production setpoint, referred to as the "improved" production setpoint SA, that is suitable for use as a production setpoint by the image production device 20 in order to produce said final image IR in which the shadowing effect that is likely to occur in the final image IR is corrected, at least in part. This improved production setpoint SA may possibly be determined in such a manner as to correct also, at least in part, the laser diffusion effect that results from laser-material interaction in a predefined substrate. This correction of the shadowing effect, and possibly also of the laser diffusion effect, is performed by the processor unit 10 relative to the target image IO that it is desired to produce.

Using the processor device 10, the steps S2 and S4 serve to determine the improved production setpoint SA that is suitable for being used by the image production device 20 in order to produce a final image IR.

In a particular example, the processor device 10 comprises (FIG. 5):
 an acquisition unit U2 configured to acquire the target image IO; and
 a determination unit U4 configured to determine the improved production setpoint SA, in compliance with steps S2 and S4.

By way of example, these units U2 and U4 may be constituted by the processor of the processor unit executing a computer program in accordance with the invention.

As shown in FIG. 5, an image production device 20 can then be used to produce (S6) the final image IR while using the improved production setpoint SA as the image production setpoint. In other words, the image production device 20 takes as input the improved production setpoint SA in order to produce the final image IR, which final image is advantageously close to the desired target image IO. The image production device 20 may be any production device as described above by way of example (a device for producing an image by laser etching, by microperforation, . . . ).

By way of example, the image production device 20 may use the improved production setpoint SA to produce an image in a substrate. The image as produced in this way may comprise a plurality of pixels formed by means of a laser. The substrate may be made of plastics material (such as polycarbonate, for example). An image production technique suitable for use is described in greater detail below with reference to FIG. 7.

The invention also provides a system comprising the above-mentioned processor device 10 and the image production device 20. In a particular example, the processor device 10 and the image production device 20 constitute a single common device.

The transfer function F that transforms a production setpoint S into a predicted image IP can be obtained by any method and/or modeling.

According to an advantageous characteristic, a model may be used to represent the image production device IP=F(S), which model determines the transmittance T of the production setpoint S as an intermediate result/variable. This amounts to resolving the transfer function F into two functions G1 and G2 such that IP=F(S)=G2(G1(S)), where G1 is a function that supplies transmittance T as a function of the production setpoint S, i.e. T=G1(S), and G2 is a function that supplies the predicted image IP as a function of the transmittance T.

For the record, transmittance is a matrix in which each element is an individual transmittance t of the pixel of an associated image I, IR, IP. The individual transmittance t represents the fraction of the light flux that passes through the associated pixel. Transmittance is also referred to as transparency.

Resolving in this way to develop the transmittance magnitude T is advantageous in that it gives physical meaning to the model, and above all in that it makes it possible to use an existing model, involving transmittance T. By way of example, it is possible to use one of the numerous existing predictive models that determine reflectance R from transmittance T.

For the record, reflectance R is a matrix in which each element is an individual reflectance r of the pixel of an associated image I, IR, IP. The individual reflectance r represents the fraction of the light flux that is reflected by the associated pixel.

From the laws of optics, it is known that a light flux encountering a transparent material is transmitted in part, reflected in part, and absorbed in part. From the principle of energy conservation, it follows that the sum of these three phenomena is constant. The transmittance t, the reflectance r, and the absorbance a are associated by the following relationship:

$$t+r+a=1.$$

Using a predictive model that determines the reflectance R as a function of the transmittance T makes it possible to write the transfer function IP=F(S) in the form of a combination of three functions, i.e. IP=F3(F2(F1(S))). This makes it possible to resolve the transfer function F into three sub-functions or models: a transmittance first function F1 transforming a production setpoint S into a transmittance T, i.e. T=F1(S), a reflectance second function F2 transforming a transmittance T into a reflectance R, i.e. R=F2(T), and an image third function F3 transforming a reflectance R into a predicted image IP, i.e. IP=F3(R).

The transmittance first function F1 is the most specific. It depends directly on the image production device.

In one implementation, it may be defined in parametric form. The parameters are then determined by training and/or calibration using a set of calibration pairs, each pair comprising a production setpoint S and the resulting transmittance T as obtained by means of the image production device.

The person skilled in the art knows how to determine a parametric form that is appropriate for the phenomenon that is to be modeled.

An illustrative example is given below in the simplified particular circumstance of a laser etching device applied to producing a monochromatic image. Under such circumstances, transmittance T is advantageously homogeneous with respect to the production setpoint S. T is the matrix having the same dimensions as S, in which each element is a scalar t. These simplifying assumptions make it possible to work pixel by pixel and to determine a function t=t(s), where t is the individual transmittance of one pixel and s is the laser intensity of the associated matching dot/pixel of the production setpoint S, also written $S_p$. p is an index for the dots/pixels of a matrix: I, IP, IR, IO, T, R, or indeed S as here. The function t=t(s) is a scalar function. It may be extended to all of the pixels of a matrix.

The function t=t(s) may be determined using resulting images IR made by the image production device on the basis of calibration production setpoints S. By way of example, these calibration setpoints comprise laser intensities that are uniformly-distributed throughout the intensity range, i.e. 0-255. The transmittance t is then determined from the resulting image IR, e.g. by photometric measurement. It is thus possible to determine a transmittance t associated with each intensity value s, and thus to tabulate the function t=t(s). This function is necessarily injective and is easily inverted.

Figure 4:
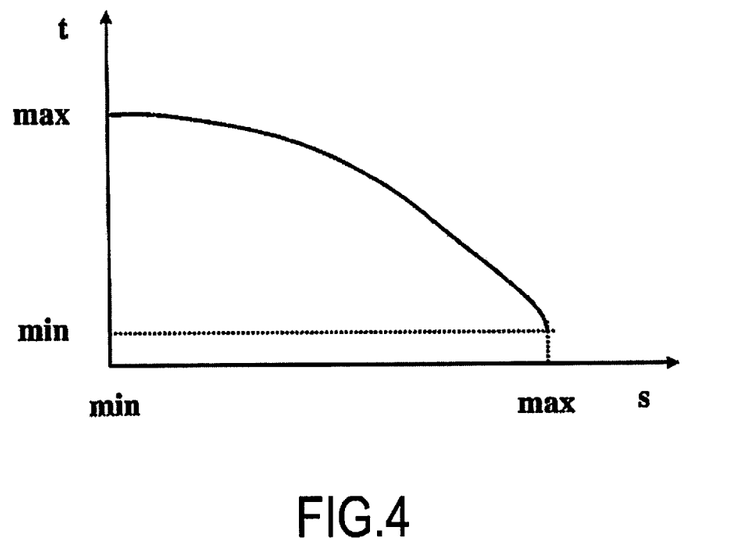
FIG. 4 shows an example function t(s)

FIG. 4 shows an example of such a function t(s). For zero intensity s, the medium 1 remains transparent and maximum transmittance t is obtained. For maximum intensity s, the substrate is made opaque and the transmittance t is at a minimum. Between these two points, the function is strictly monotonic.

Numerous predictive models that determine the reflectance R as a function of the transmittance T exist and are described in the literature: diffuse reflection of light; Fresnel surface reflection; lateral diffusion of light; physical and optical dot gain; Yule-Nielsen model; Neugebauer spectral model; Ruckdeshel and Hauser model, Clapper-Yule model; to mention only the best known. Any of them can be used to provide the second function F2.

A preferred implementation is proposed and described on the basis of a modified "low diffraction" Clapper-Yule model. According to that model, the second function F2 is given by the following formula:

$$R = F2(T) = \frac{b \cdot k_1 \cdot T^2}{1 - k_2 \cdot T^2} + \frac{(1-b) \cdot k_1 \cdot (T*M) \cdot T}{1 - k_2 \cdot (T^2*M)}$$

where:
R is the reflectance matrix;
b∈[0,1] is a scalar parameter;
$k_1$, $k_2$∈[0,1] are two optical constants,
T is the transmittance matrix;
* is the convolution operator; and
M is a convolution kernel.

This model serves to calculate a reflectance R as a function of a transmittance T. Compared with the Clapper-Yule model, this model is modified in particular by adding convolution and a convolution kernel M. This kernel M serves advantageously to introduce explicitly a model of the shadowing phenomenon that is characteristic of the problem involved.

The convolution operation * is well known in the field of image processing. For the record, the convolution A*N of a matrix A with a kernel N, which matrix is square and of odd dimension, produces a matrix B having the same dimensions as A. An element $D_{i,j}$ of B is defined by:

$$b_{i,j} = (A*N)_{i,j} = \sum_k \sum_l A_{i-k, j-l} \cdot N_{k,l}$$

According to another characteristic, the second function F2 further comprises an operator K. This operator K is for modeling the transfer function of a scanner used while acquiring the resulting image IR, and that it is desired to compare with a predicted image IP.

This operator may comprise any modification of the image such as: scaling, interpolation, linearization, etc.

In an implementation, the second function F2 is defined by the following formula:

$$R = F2(T) = \left( \frac{b \cdot k_1 \cdot T^2}{1 - k_2 \cdot T^2} + \frac{(1-b) \cdot k_1 \cdot T(T*M)}{1 - k_2 \cdot (T^2*M)} \right) *K$$

where:
R, b, $k_1$, $k_2$, T, and M are the same elements as above;
* is the convolution operator; and
K is the convolution kernel.

The operator K is expressed herein in the form of a convolution with a convolution kernel K.

In one possible implementation, the operator K models the scanner solely by noise K.

By way of example, in an implementation, this noise is two-dimensional Gaussian noise having a standard deviation σ. The person skilled in the art knows how to determine such a kernel K.

In one possible implementation, $$k_1 = (1-r_s) \cdot r_g \cdot (1-r_i) \text{ and } k_2 = r_g \cdot r_i,$$

where $r_s$ is the specular reflection index of the air-image interface, $r_i$ is the internal Fresnel reflectance index of the air-image interface, and $r_g$ is the intrinsic reflectance index of a Lambertian reflector substrate. These three indices are known to, or determinable by, the person skilled in the art. The first two are known: $r_s=0.04$ and $r_f=0.6$. $r_g$ can be determined using the formula:

$$r_g = \frac{R_w}{r_f \cdot R_w + (1-r_s) \cdot (1-r_f)}$$

where $R_w$ is the reflectance of the white image medium 1, i.e. the image medium 1 prior to any image production operation. $r_g$ depends on the material. $R_w$ may be obtained by measuring reflectance on a blank image medium 1.

It is mentioned above that the convolution kernel M may advantageously be used for modeling the shadowing effect. Convolution is particularly appropriate in that it makes it possible to introduce the influence of a dot on its neighborhood. This is exactly what the shadowing phenomenon constitutes: each dot projects a shadow on its neighbors.

The person skilled in the art knows how to define or modify the content of the kernel M in order to model the shadowing physical phenomena as well as possible.

In a simple possible implementation, the shadowing may be considered as giving rise to fuzziness. In known manner, one possible convolution kernel M for producing fuzziness is a unit square matrix [1], i.e. a square matrix containing only 1s. For the convolution to be unitary and to conserve luminance, the norm of the kernel M is advantageously normalized to be 1. I.e. $M=[1/d^2]_{d \times d}$, where d is the dimension of the kernel M. The effect of convolution with such a normalized unit kernel is to perform spatial averaging of a dot with its neighborhood. A convolution kernel is a matrix of dimension d×d, where d is preferably odd. In this example, the value of d determines the size of the neighborhood that is impacted by the shadowing effect.

According to a characteristic, the dimension d is a parameter that is taken as an unknown and that is determined while calibrating the transfer function F.

The image third function F3 serves to transform a reflectance R into a predicted image IP, i.e. IP=F3(R). The reflectance R is the quantity of light that is reflected when the medium 1 is illuminated by multidirectional illumination 3. Under certain assumptions, the matrix R is also proportional to the image. According to a characteristic, and assuming that the proportionality factors are equal to 1, the function F3 is the identity function. I.e. IP=F3(R)=R.

It is thus possible to construct a transfer function F. This transfer function F calculates a predicted image IP as a function of a production setpoint S. Depending on the assumptions made concerning F, certain parameters remain to be determined.

Thus, with the illustrative assumptions set out above, the transfer function F is determined by knowing the parameters b and d. If an operator K is also taken into consideration, it is also necessary to know the parameters that define the operator K, i.e. in the illustrative example of Gaussian noise, its standard deviation σ.

With another model for F, it may be necessary to determine other parameters. The method of determining them by calibration and/or training nevertheless remains identical.

According to a characteristic, the parameters defining the transfer function F are determined by calibration or by training. This makes it possible to solve an equation of the form:

$$\text{parameters} = \arg\min \sum_p \Delta(IR_p, IP_p) = \arg\min \sum_p \Delta(IR_p, F(S_p))$$

in order to determine the parameters, e.g. b, d, and possibly also the standard deviation σ, which are the unknowns.

This equation is a target function. In known manner, solving it consists in determining the optimum values for the parameters mentioned on the left in order to minimize the expression on the right. Because of the large number of unknowns, this solving is usually performed by an iterative method, as performed automatically by means of a computer solver. The principle is to vary the looked-for parameters, as specified on the left, in the expression on the right, until optimum values are obtained for the parameters that minimize the expression.

In the present example, the expression for minimizing compares a resulting image IR, as made physically, and as obtained by the image production device while using the production setpoint S, with a predicted image IP as obtained by means of the transfer function F on the basis of the same production setpoint S, i.e. IP=F(S). These two images IR and IP are compared pixel to pixel. $IR_p$ is a pixel of the resulting image IR, as observed or scanned. $IP_p$ or $F(S_p)$ is a pixel of the predicted image IP as predicted by the transfer function F from the production setpoint S. p is an index running through all of the pixels of each of the two images, i.e. the resulting image IR or the predicted image IP. Each pixel of an image is compared with the matching pixel of the other image by means of a difference/distance operator Δ providing a positive or zero value representative of the difference. The target function that is to be minimized sums all of these differences over all of the pixels.

In an implementation, the operator Δ is a colorimetric distance. The person skilled in the art knows numerous formulations for such colorimetric distances.

With monochrome images, in which each pixel is a scalar, the operator Δ can be considered as an absolute value for the difference.

This makes it possible to determine the parameters and thus to define the transfer function F completely.

In such an implementation, it is appropriate to feed the solving operation with calibration pairs. Each calibration pair comprises a production setpoint S and a corresponding resulting image IR obtained by the initial production method using the production setpoint S. This requires a series of images IR to be made physically from the series of production setpoints S. Each resulting image IR is scanned so that it can be compared with the corresponding predicted image IP=F(S) as obtained from the same production setpoint S. The number of such calibration pairs depends on the number of unknown parameters that are to be determined.

In an illustrative example, where F depends on b, d, and σ, a set of a few tens of calibration pairs suffices to calibrate the transfer function F and to determine the optimum values for each of the parameters b, d, and σ. By way of example, this calibration set comprises: 20 or 30 uniform production setpoints, each comprising a single laser intensity, these intensities varying in uniformly distributed manner between zero intensity and maximum intensity, with other production setpoints comprising periodic patterns of varying frequencies in the row and/or column directions, or indeed production setpoints comprising patterns that are representative of the application.

Once the transfer function F has been determined, a predicted image IP=F(S) as obtained from a given production setpoint S can be calculated. By comparing this predicted image IP with the target image IO, and by attempting to minimize the distance between them, it is possible to optimize a new target function and to determine an improved production setpoint SA.

This can be done by solving an equation of the following form:

$$SA = \operatorname*{argmin}_{S} \sum_{p} (\Delta(IO_p, IP_p))^2 = \operatorname*{argmin}_{S} \sum_{p} (\Delta(IO_p, F(S_p)))^2$$

where:
S is a production setpoint;
IO is a target image;
IP is a predicted image obtained from S, i.e. IP=F(S);
p is an index running through the pixels;
F is the transfer function; and
$\Delta$ is a colorimetric distance between two pixels.

An example of a colorimetric distance suitable for use in this example and/or in the above-described solving operations, is the colorimetric distance $DE_{94}$ as defined by the International Commission on Illumination (CIE, from its initials in French).

As explained above, the present invention may be applied to any image production method. In other words, the invention makes it possible to improve a production setpoint suitable for being applied to any image production device in order to obtain a final image by printing by laser. Such printing by laser may be performed using various techniques and in any layer of a substrate. As mentioned above, the image production device used may be any image production device as described above by way of example (a device for producing images by laser etching, by microperforation, . . . ).

Figure 7:
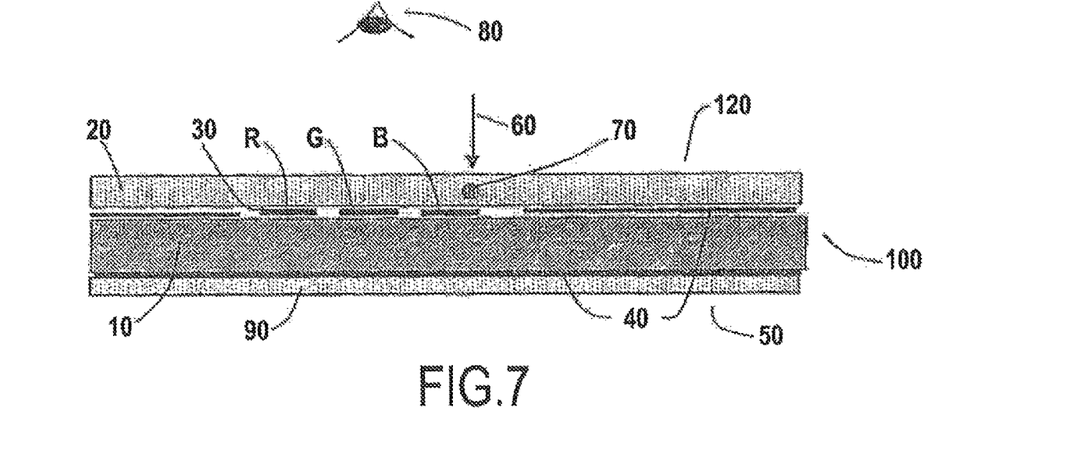
FIG. 7 is a diagram showing a method of producing an image using an image production device in accordance with a particular implementation of the invention.

FIG. 7 shows a section 100 of an identity document including a color laser image produced by a fabrication method to which it is possible to apply the principle of the present invention. The document has an opaque document body 10, e.g. a white body. On its front face 120, a laserizable transparent protection layer 20 is laminated over subpixels 30 of various colors (e.g. red, green, and blue) possibly together with decoration and/or an anticounterfeiting system 40. By way of example, the subpixels 30 form a matrix of subpixels. Decoration and/or anticounterfeiting systems may also be formed on the rear face 50 of the identity document. The assembly is protected by a protective layer 90 that is laminated on the rear face 50 of the identity document. In a particular laser image production method, a laser beam 60 is applied in order to generate gray levels 70 in the laserizable layer 70 over certain subpixels 30 by means of carbonization, thereby forming the gray levels 70 of a personalized laser color image. These gray levels 70 are layers that have been made opaque by laser carbonization in the laserizable layer 20. Applying the laser serves to make the laserizable layer 10 opaque locally so as to make opaque certain subpixels 30 that are situated in register, thereby developing a color image by using the matrix of subpixels. This final image is observed by an observer 80 by reflection of ambient light on the personalized color laser image, which light passes through the laserizable layer 20. Other embodiments are possible in which light coming from any light source may be applied in particular to the front face 120 and/or to the rear face 50 of the identity document in order to develop the final image. The arrangement of the subpixels 30 and of the laserizable layer 10 may also be adapted depending on circumstances. In particular, the laserizable layer 10 may alternatively be arranged under the pixels 30 so as to develop the final image by laser carbonization as explained above. Furthermore, the laserizable layer 10 may be made of a plastics material (e.g. such as polycarbonate).

The present invention may be applied in particular to making an identity document, or to any other image printing, using the production method shown in FIG. 7. In particular, the invention may be performed in order to obtain an improved production setpoint that is suitable for being used as a production setpoint by an image production device that is to make an image in the manner described with reference to FIG. 7. The invention can advantageously reduce or even avoid the shadowing effect that can result from opaque zones 70 in the laserizable layer 20, and can possibly also correct, at least in part, the effect of diffusion of the laser that results from laser-material interaction in the material of the substrate.

The invention claimed is:

1. A processing method for producing a final image (IR) comprising pixels juxtaposed in a substrate presenting thickness and producing an image that possesses thickness so that each pixel produces a shadowing effect on its neighboring pixels, said method comprising:
   determining, using a target image, a production setpoint suitable for being used by an image production device to produce said final image;
   wherein the determining comprises:
      modeling the image production device by means of a transfer function that transforms a production setpoint into a corresponding predicted image; and
      by inverting at least a portion of the transfer function, determining an improved production setpoint suitable for being used as a production setpoint by the production device in order to produce said final image in such a manner as to correct, at least in part, the shadowing effect in the final image.

2. A method according to claim 1, wherein, during the determining, the improved production setpoint is selected so that the corresponding predicted image is as close as possible to the target image in order to minimize the shadowing effect in the final image.

3. A method according to claim 1, wherein the thickness of the substrate of the image is not less than n times the transverse dimension of a pixel, where n=1.5.

4. A method according to claim 1, wherein the image production device is a laser etching device suitable for darkening a transparent substrate and wherein a production setpoint is a map of laser shots.

5. A method according to claim 1, wherein the image production device is a microperforation device suitable for making microholes a transparent substrate and wherein a production setpoint is a map of perforations.

6. A method according to claim 1, wherein the modeling of the image production device determines a transmittance for the production setpoint as an intermediate result.

7. A method according to claim 1, wherein the transfer function F combines a transmittance first function F1 transforming a production setpoint S into a transmittance T, where T=F1(S), a reflectance second function F2 transforming a transmittance T into a reflectance R, where R=F2(T), and an image third function F3 transforming a reflectance R into a predicted image IP, where IP=F3(R), such that IP=F(S)=F3(F2(F1(S))).

8. A method according to claim 7, wherein the first function F1 is defined in a parametric form, and the parameters are determined by calibration.

9. A method according to claim 7, wherein the first function F1 is determined empirically and is tabulated.

10. A method according to claim 7, wherein the second function F2 is given by the following formula:

$$R = F2(T) = \frac{b \cdot k_1 \cdot T^2}{1 - k_2 \cdot T^2} + \frac{(1-b) \cdot k_1 \cdot (T*M) \cdot T}{1 - k_2 \cdot (T^2*M)}$$

where:
R is a reflectance matrix;
$b \in [0,1]$ is a scalar parameter;
$k_1, k_2 \in [0,1]$ are two optical constants;
T is the transmittance matrix;
* is the convolution operator; and
M is a convolution kernel.

11. A method according to claim 10, wherein the second function F2 also includes noise K having the formula:

$$R = F2(T) = \left( \frac{b \cdot k_1 \cdot T^2}{1 - k_2 \cdot T^2} + \frac{(1-b) \cdot k_1 \cdot (T*M) \cdot T}{1 - k_2 \cdot (T^2*M)} \right) * K$$

where:
* is the convolution operator; and
K is a convolution kernel.

12. A method according to claim 11, wherein K is a two-dimensional Gaussian kernel of standard deviation $\sigma$.

13. A method according to claim 10, wherein:

$$k_1 = (1-r_s) \cdot r_g \cdot (1-r_i) \text{ and } k_2 = r_g \cdot r_i,$$

where $r_s$ is the specular reflection index of the air-image interface, $r_i$ is the internal Fresnel reflectance index of the air-image interface, and $r_g$ is the intrinsic reflectance index of a Lambertian reflector substrate.

14. A method according to claim 10, wherein the convolution kernel M is a normalized unity square matrix of dimensions d×d, where $M = [1/d^2]_{d \times d}$.

15. A method according to claim 7, wherein the third function F3 is the identity function.

16. A method according to claim 7, wherein the transfer function F is calibrated by identifying the parameters b, d and the standard deviation $\sigma$, by solving the following equation:

$$b, d, \sigma = \underset{\substack{b \in [0,1] \\ d > 0 \\ \sigma \geq 0}}{\operatorname{argmin}} \sum_p \Delta(IR_p, IP_p) = \underset{\substack{b \in [0,1] \\ d > 0 \\ \sigma \geq 0}}{\operatorname{argmin}} \sum_p \Delta(IR_p, F(S_p))$$

where:
S is a production setpoint;
IR is a final image obtained by means of the production device using the production setpoint S;
IP is a predicted image as predicted by the transfer function F from the production setpoint S, i.e. IP=F(S);
p is an index running through the pixels;
F is the transfer function; and
$\Delta$ is a colorimetric distance between two pixels.

17. A method according to claim 16, wherein the solving operation is fed with calibration pairs comprising a production setpoint S and a final image (IR) by means of the production device using the production setpoint S.

18. A method according to claim 1, wherein the step of determining an improved production setpoint SA comprises an automatic interactive calculation minimizing a distance between the target image and a predicted image as predicted by the transfer function F when applied to the improved production setpoint SA.

19. A method according to claim 1, wherein the step of determining an improved production setpoint SA comprises solving the following equation:

$$SA = \underset{\hat{S}}{\operatorname{argmin}} \sum_p (\Delta(IO_p, IP_p))^2 = \underset{\hat{S}}{\operatorname{argmin}} \sum_p (\Delta(IO_p, F(S_p)))^2$$

where:
S is a production setpoint;
IO is a target image;
IP is an image as predicted by the transfer function from the production setpoint S, where IP=F(S);
p is an index running through the pixels;
F is the transfer function; and
$\Delta$ is a colorimetric distance between two pixels.

20. A method according to claim 1, wherein, during the determining, the improved production setpoint is determined so that it also corrects at least in part a laser diffusion effect that can result from laser-material interaction in material of the substrate.

21. A production setpoint determined by a method according to claim 1.

22. A method of producing a final image, the method comprising:
using a processor device to determine an improved production setpoint by a method according to claim 1; and
using an image production device to produce said final image by using said improved production setpoint SA as its image production setpoint.

23. A processor device configured to produce a final image that comprises pixels juxtaposed in a substrate presenting thickness and producing an image that possesses thickness so that each pixel produces a shadowing effect on its neighboring pixels, said processor device comprising:
an acquisition unit for acquiring a target image; and
a determination unit configured to use the target image to determine a production setpoint suitable for being used by an image production device to produce said final image;
wherein the determination unit is configured to perform operation comprising:
modeling the image production device by means of a transfer function transforming a production setpoint into a corresponding predicted image; and
by inverting at least a portion of the transfer function, determining an improved production setpoint suitable for use as a production setpoint by the production device in order to produce said final image in such a manner as to correct at least in part the shadowing effect in the final image.

24. A processor device according to claim 23, further comprising:
a production device configured to produce said final image by using said improved production setpoint as its image production setpoint;
wherein the processor device and the production device form a system to produce the final image.

* * * * *